US008668540B1

(12) United States Patent
Spivey

(10) Patent No.: US 8,668,540 B1
(45) Date of Patent: Mar. 11, 2014

(54) METHOD AND APPARATUS FOR SEPARATING THE GLASS PANEL FROM A CATHODE RAY TUBE

(75) Inventor: Curtis W. Spivey, Medford, OR (US)

(73) Assignee: ECS Refining, LLC, Santa Clara, CA (US)

( * ) Notice: Subject to any disclaimer, the term of this patent is extended or adjusted under 35 U.S.C. 154(b) by 0 days.

(21) Appl. No.: 13/618,918

(22) Filed: Sep. 14, 2012

(51) Int. Cl.
*H01J 9/50* (2006.01)

(52) U.S. Cl.
USPC ............... 445/2; 83/54; 83/13; 65/23; 65/28; 225/103

(58) Field of Classification Search
USPC ............ 445/2; 83/13, 54; 65/23, 28; 225/103
See application file for complete search history.

(56) References Cited

U.S. PATENT DOCUMENTS

| 3,885,356 A | | 5/1975 | Armstrong | |
|---|---|---|---|---|
| 3,894,858 A | * | 7/1975 | Rogers | 65/23 |
| 3,997,311 A | * | 12/1976 | Rogers | 65/23 |
| 4,000,997 A | * | 1/1977 | Rogers | 65/23 |
| 4,844,236 A | | 7/1989 | Kraus | |
| 4,952,185 A | * | 8/1990 | Lee | 445/2 |
| 5,045,009 A | * | 9/1991 | Cordingley et al. | 445/30 |
| 5,350,121 A | | 9/1994 | Vitunac et al. | |
| 5,375,774 A | | 12/1994 | Perry | |
| 5,595,520 A | * | 1/1997 | Piascinski et al. | 445/59 |
| 5,961,359 A | * | 10/1999 | Kostick | 445/2 |
| 2002/0187704 A1 | * | 12/2002 | Monks | 445/3 |
| 2003/0124943 A1 | * | 7/2003 | Saimoto et al. | 445/2 |
| 2004/0160200 A1 | * | 8/2004 | Hakage et al. | 315/370 |
| 2011/0197724 A1 | * | 8/2011 | Harris et al. | 83/13 |

OTHER PUBLICATIONS

Product literature entitled "Posi-Flow™ Vibrating Conveyors," by Carrier Vibrating Equipment, Inc., 12 pages (1997).
Product literature entitled "Vibrating Conveyors for Bulk Material Flow, Batch Loading and Unit Handling," by Carman Industries, Inc., 6 pages (1998).

* cited by examiner

*Primary Examiner* — Mary Ellen Bowman
(74) *Attorney, Agent, or Firm* — Thompson Hine L.L.P.

(57) ABSTRACT

An apparatus for separating a panel from a cathode ray tube may include a trough, at least one chipping element mounted in the trough; and a vibrator connected to the trough and configured such that actuation of the vibrator causes the chipping element to vibrate at a frequency and at a throw angle selected to cause the chipping element to throw a cathode ray tube placed in contact therewith upward, then move upward subsequently to contact a downwardly moving cathode ray tube with sufficient force to chip away funnel and frit therefrom. A method for separating a panel from a cathode ray tube may include contacting a funnel of the cathode ray tube with at least one chipping element, and vibrating the chipping element with sufficient force to chip at least the funnel from the cathode ray tube, leaving at least the panel.

28 Claims, 5 Drawing Sheets

METHOD AND APPARATUS FOR SEPARATING THE GLASS PANEL FROM A CATHODE RAY TUBE

BACKGROUND

The present invention relates to methods and apparatus for separating the glass panel from a cathode ray tube, and more particularly, to methods and apparatus using a vibratory conveyer to separate the glass panel from a cathode ray tube.

A typical cathode ray tube (CRT) is made largely of glass and may include a funnel or bell portion and a panel portion bonded together by a ceramic frit. The funnel portion may include such components as an electron gun and a shadow mask. Cathode ray tubes also include an implosion band—a metal band strapped around the panel portion of the cathode ray tube approximately one-quarter to three-quarters inches from the ceramic frit line.

A typical cathode ray tube is made up of two types of glass, both of which are impregnated with a metal in order to reduce the emission of x-rays and other radiation from the electron gun, and with respect to the panel, to improve clarity. The panel glass makes up approximately 70% of the weight of a cathode ray tube and may contain approximately 0.05-4.0% lead in the form of lead oxide (PbO). In later model CRTs, panel glass contained barium oxide instead of lead oxide. In contrast, the funnel glass, which makes up approximately 30% of the weight of the CRT, may contain as much as 18-22% lead. The bonding ceramic frit is a lead oxide paste that may contain as much as 70-85% lead.

At one time, such cathode ray tubes were used extensively in televisions, computer monitors and other video monitors, as well as for oscilloscopes and other types of electronic displays incorporated in electronic equipment. However, cathode ray tubes are no longer in demand for such products, having been replaced by screens incorporating more modern display technologies such as liquid crystal display (LCD), plasma display, and organic light emitting diode (OLED). Since the manufacture of cathode ray tubes is now all but nonexistent, there is no demand for discarded cathode ray tubes to be recycled and their components to be reused to make new cathode ray tubes. It is now necessary to dispose of the various components of a CRT in compliance with regulations regarding lead-containing waste, as well as general recycling of glass with lead content.

Typically, lead content in glass products for recycling may not exceed 0.05%. Consequently, panel glass of a CRT may be recycled, but not the frit or the funnel glass. In order to recycle CRT panel glass, it is necessary to separate the low-lead content panel glass from the high-lead content funnel glass and frit portion of a CRT. Current technologies may utilize a mechanical saw to cut the panel glass from the funnel glass and frit of the cathode ray tube. Such mechanical saws may include a laser or a diamond-coated metal blade, water jet, or hot water.

A disadvantage with using such mechanical saws is that the sawing process is time consuming and therefore expensive. Typically, use of such saws to separate panel glass from the frit and funnel glass of a CRT operates at a speed of from one to four tubes per minute. In addition, if the CRT is received with a broken funnel, it may be difficult to align the tube in the saw to make an accurate cut.

Other types of devices have been utilized to separate the panel from the frit and funnel of a cathode ray tube. For example, vibratory screeners have been employed in which a processor separates the glass from a completely broken up cathode ray tube by lead concentration using x-rays. However, while production from such a process may be higher in terms of pounds per hour, the purity of the recovered panel may be compromised, and conversely, a significant amount of clean panel may be discarded along with broken-up funnel and frit material.

Accordingly, there is a need for a process and apparatus that separates the panels of a cathode ray tube from the frit and funnel components that is accurate, and provides a relatively high production rate and low cost.

SUMMARY

The present disclosure is directed to a method and process for recovering panel glass of a cathode ray tube by separating it from the funnel glass and frit. In one embodiment, an apparatus for separating a panel from a cathode ray tube may include a trough, at least one chipping element mounted in the trough and a vibrator connected to the trough and configured such that actuation of the vibrator causes the chipping element to vibrate at a frequency and at a throw angle selected to cause the chipping element to throw a cathode ray tube placed in contact therewith upward, then move upward subsequently to contact a downwardly moving cathode ray tube with sufficient force to chip away funnel and frit therefrom.

In another embodiment, an apparatus for separating a panel from a cathode ray tube may include a trough having a feeding end and a discharge end, the trough being inclined downward from the feeding end to the discharge end, a plurality of chipping elements mounted in the trough, and a vibrator connected to the trough and configured such that actuation of the vibrator causes the chipping elements to vibrate at a frequency and at a throw angle selected to cause the at chipping elements to throw a cathode ray tube placed in contact therewith upward at an angle inclined toward the feeding end, then move upward subsequently to contact a downwardly moving cathode ray tube with sufficient force to chip away funnel and frit therefrom.

In another embodiment, A method for separating a glass panel from a cathode ray tube, may include contacting a funnel of the cathode ray tube with at least one chipping element, and vibrating the chipping element with sufficient force to chip at least the funnel from the cathode ray tube, leaving at least the panel glass. In yet another embodiment, a method for separating a glass panel from funnel glass and frit of a cathode ray tube may include contacting the funnel of the cathode ray tube with at least one chipping element, vibrating the chipping element with sufficient force to chip at least the funnel from the cathode ray tube, leaving at least the panel.

Other objects and advantages of the present disclosure will be apparent from the following description, the accompanying drawings and the appended claims.

DETAILED DESCRIPTION

Figure 1:
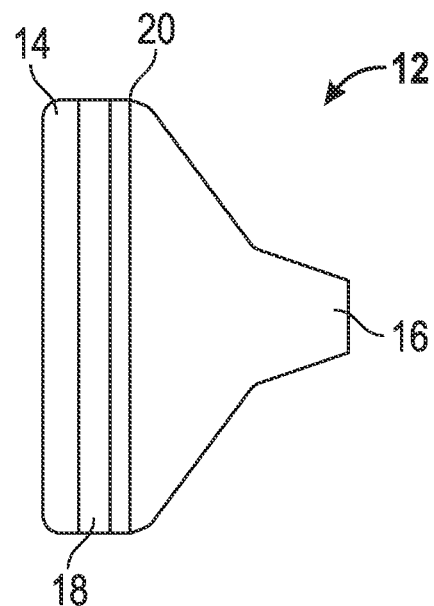
FIG. 1 is a side elevation of a typical cathode ray tube.
Figure 3:
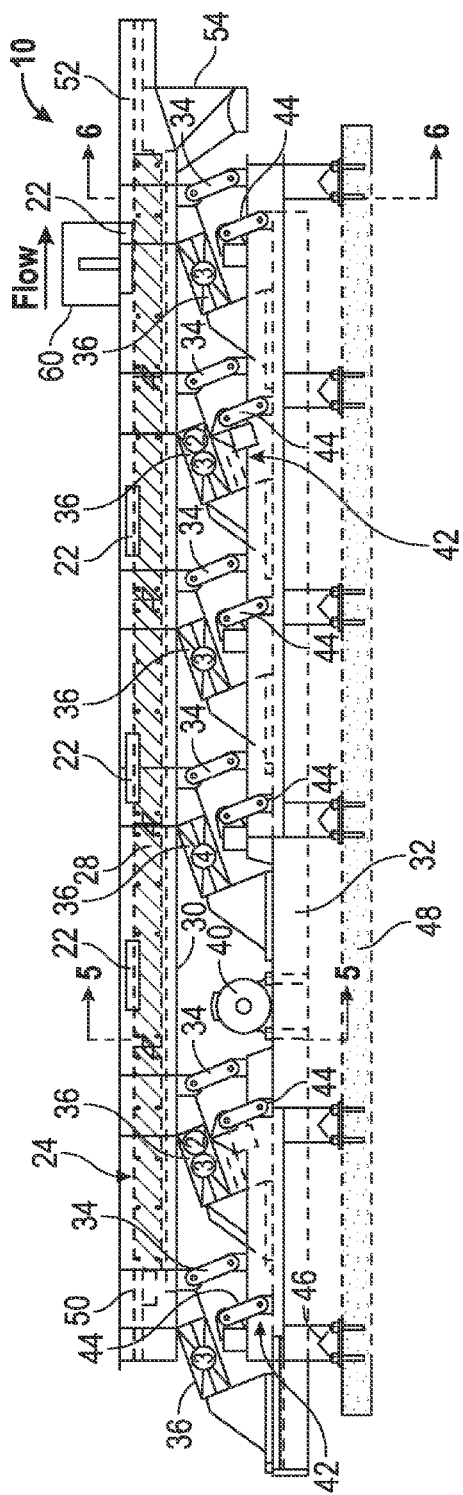
FIG. 3 is a side elevation of one embodiment of the disclosed apparatus for separating the glass panel from a cathode ray tube.
Figure 4:
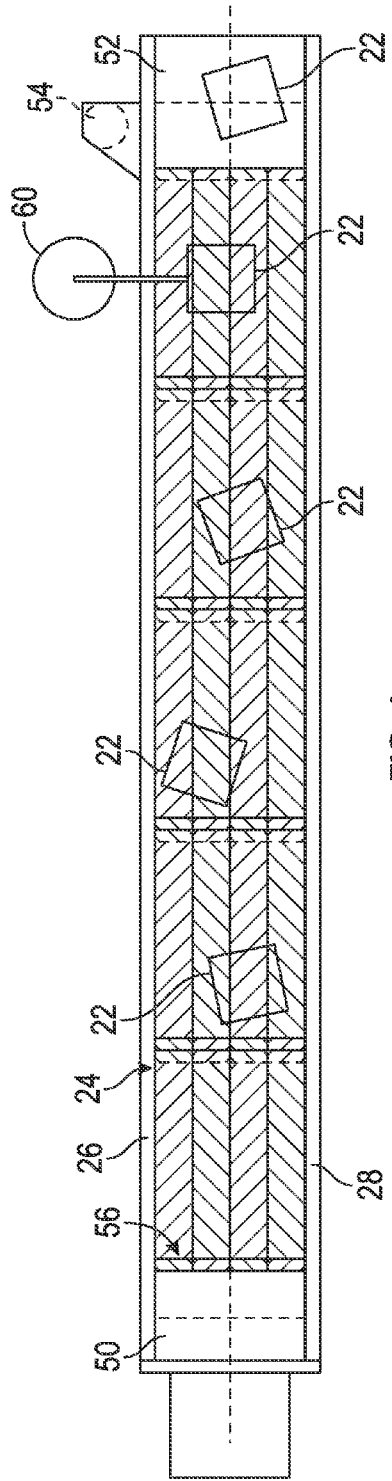
FIG. 4 is a top plan view of the apparatus shown in FIG. 3.
Figure 5:
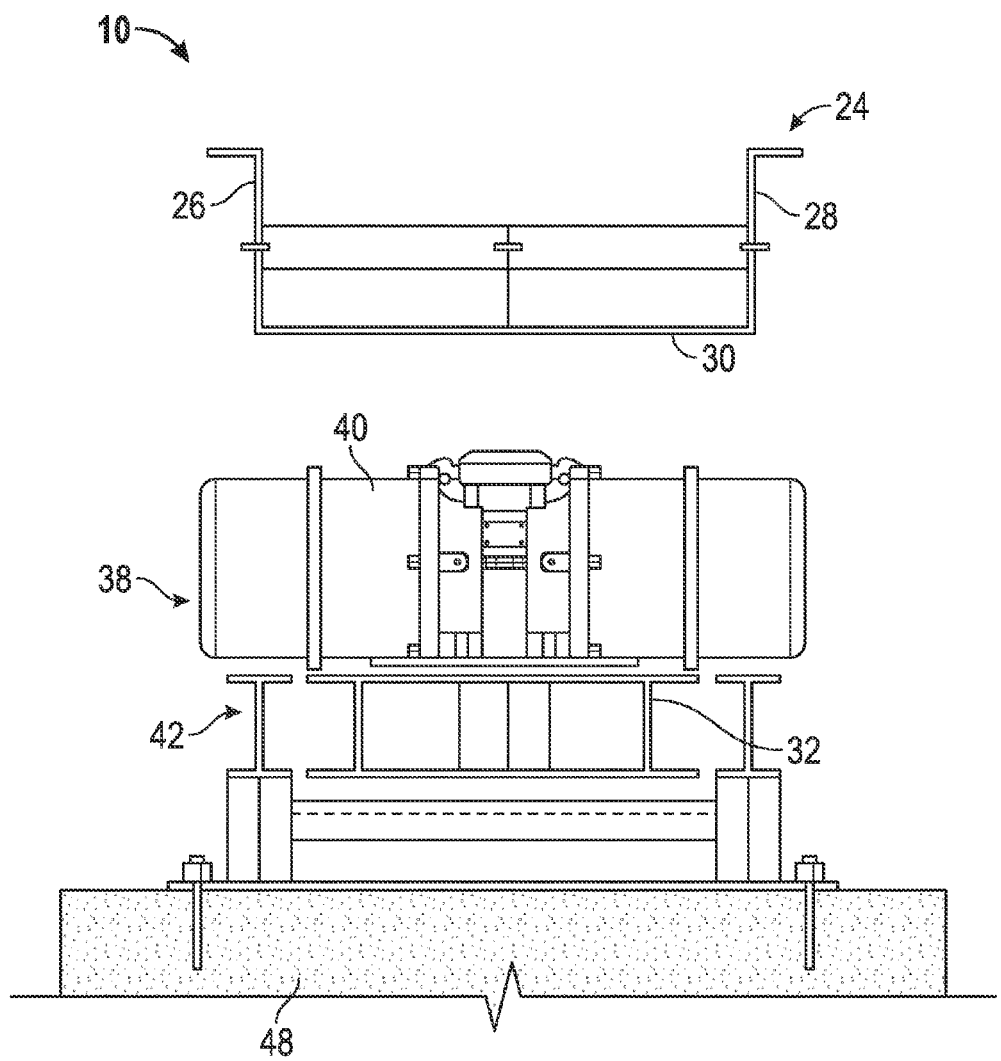
FIG. 5 is an end elevation in section taken at line 5-5 of FIG. 3.
Figure 6:
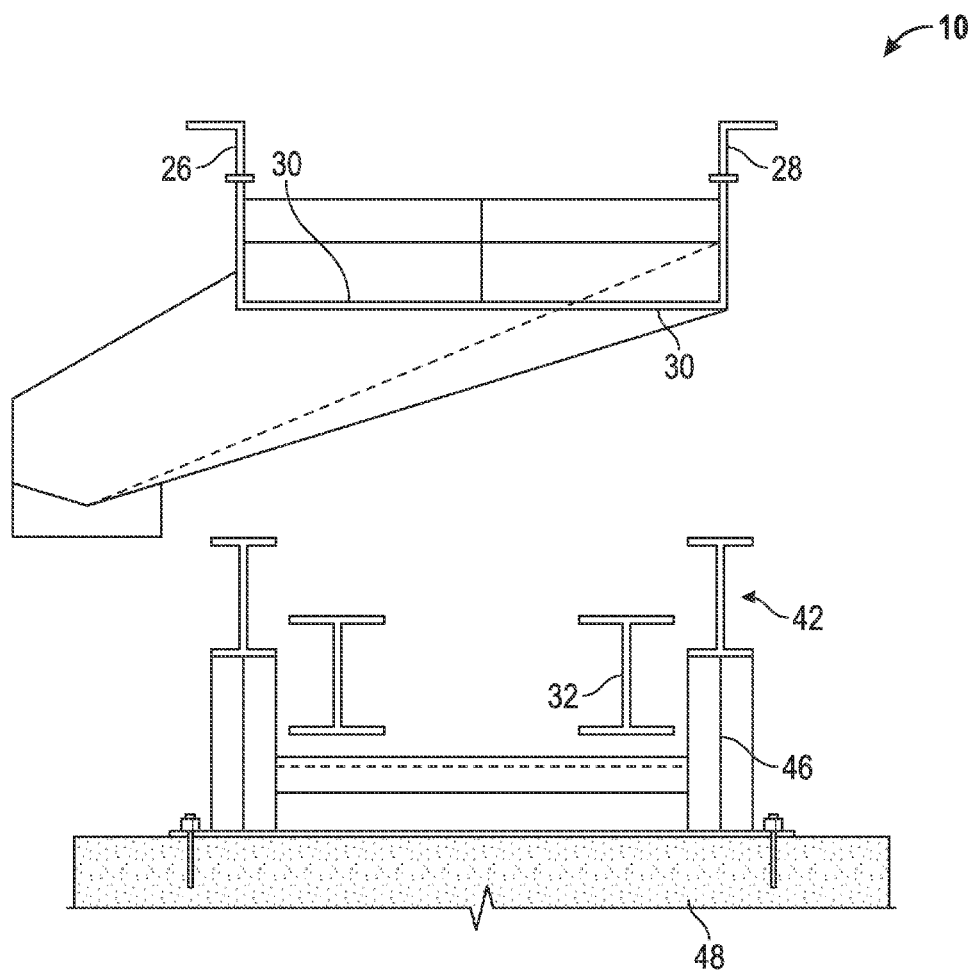
FIG. 6 is an elevation in section taken at line 6-6 of FIG. 3.

The disclosed apparatus for separating the glass panel from a cathode ray tube is shown in FIGS. 3 and 4 and is generally designated 10. A typical cathode ray tube 12 processed by the apparatus 10 is shown in FIG. 1. The cathode ray tube 12 may include a panel 14, a funnel 16, and an implosion band 18. The panel 14 is made largely of glass and comprises approximately 70% of the weight of the tube 12. The panel glass may contain approximately 0.005-4.0% lead. The panel 14 may be bonded to the funnel 16 by a ceramic frit 20, which may be a lead oxide paste containing as much as 75-80% lead. The funnel 16 may comprise approximately 30% of the weight of the tube 12, and contain such components as an electron gun and a shadow mask, and support a yoke of magnetic coils. The funnel glass may contain approximately 18-22% lead. The implosion band 18 is made of metal and is spaced about ¾ inches toward the panel 14 from the frit 20.

Figure 2:
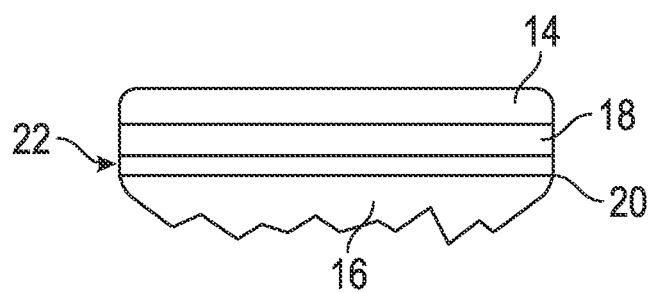
FIG. 2 is a detail of the cathode ray tube of FIG. 1, showing the funnel portion partially broken away prior to application of the method and apparatus of the present disclosure.

As shown in FIG. 2, prior to treatment by the disclosed apparatus 10 (FIGS. 3-6) a majority of the funnel 16 of a CRT 12 may be broken away from the remainder of the tube, leaving the remainder of the funnel, the frit 20, implosion band 18 and panel 14. Also, the electron gun, shadow mask and yoke (all not shown) associated with the funnel 16 may be removed.

As shown in FIGS. 3, 4, 5 and 6, the apparatus 10 may include a trough 24 having side walls 26, 28 extending upwardly from a generally flat bed 30. The trough 24 may be elongate in shape and oriented such that product flow is in the longitudinal direction. The trough 24 may include a feeding end 50 and a discharge end 52 at opposite ends of the bed 30. In embodiments, the trough 24 may include a discharge chute 54 that communicates with the discharge end 52 of the trough 24. The trough 24 may be made of steel and attached to a base frame 32 by rocker arms 34 and coil springs 36. The rocker arms may be pivotally attached to the trough 24 and base frame 32. The base frame 32 also may support an eccentric drive assembly 38 (FIG. 5) that may include a motor 40.

The support frame 32 may be mounted on an isolation frame 42 by pivot arms 44. The isolation frame 42 may include support legs 46 that are mounted on a floor that may consist of a concrete pad 48. The isolation frame 42 may act to isolate the vibratory action of the apparatus 10 and minimize transmission of vibration to the pad 48. Actuation of the electric motor 40 may drive the eccentric drive assembly 38 to impart a reciprocating or oscillating motion to the base frame 32. This motion may be in a longitudinal direction relative to the trough 24, and may be transmitted to the trough through the springs 36 and rocker arms 34.

Although the support frame 32 and trough 24 are shown oriented horizontally, or substantially horizontally, in FIGS. 3, 4, 5 and 6 (i.e., substantially parallel to the floor or pad 48), in other embodiments, the trough 24 may be inclined such that the feeding end 50 of the trough is elevated above the discharge end 52. In embodiments, the trough 24 may be elevated at an angle of approximately 30° to the horizontal. This inclination may be accomplished by varying the height of the support legs 46, or alternately, by varying the lengths of the springs 36 and support arms 34. In other embodiments, the elevation may be adjusted by varying the lengths of the support arms 44 that connect the base frame 32 to the support frame 42.

Although the vibrating conveyer shown in FIGS. 3-6 is of the isolated-balanced type, it is within the scope of the disclosure to provide a device 10 that utilizes other designs of vibrating conveyers, such as base mounted, isolated weighted base balancing, balanced, and base excited balancing in isolation vibration conveyers, as well as leaf spring-type vibrating conveyers. In embodiments, the drive unit 38 may be selected to cause the trough 24 to vibrate to impart a throw angle of between 5° and 15° to the plane of the bed 30, and more particularly for a trough of between 20-24 feet in length.

In some embodiments, this throw angle may be in a direction that is uphill (i.e., toward the feeding end 50), with embodiments in which the trough 24 is inclined downwardly from the feeding end 50 to the discharge end 52. In embodiments where the trough may be oriented horizontally, or substantially horizontally, the throw angle may be in a direction toward the discharge end 52 sufficient to move CRTs 22 toward the discharge end by vibrating action. In some embodiments, the motor 40 may operate to drive the eccentric drive assembly to vibrate the trough 24 at between 900-100 hz. In other embodiments, the trough 24 may be vibrated at about 600 hz.

Figure 9:
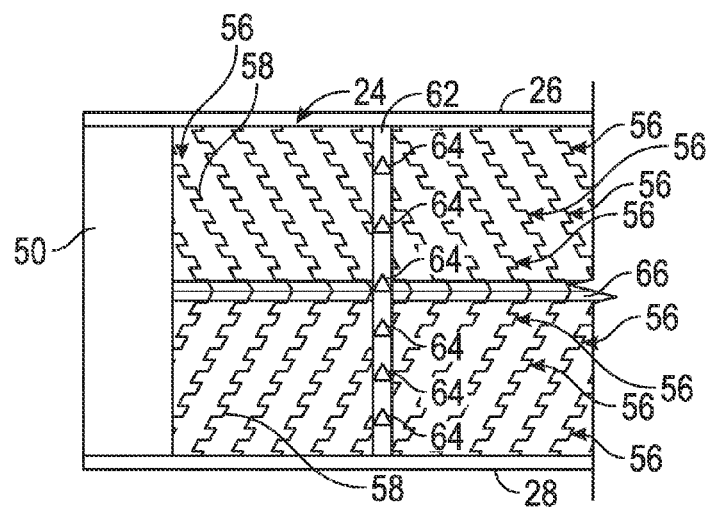
FIG. 9 is a detail top plan view of the apparatus shown in FIGS. 3 and 4.

As shown in FIGS. 4 and 9, the trough 24 may include a plurality of chipping elements, generally designated 56, that extend along its length from the feeding end 50 to the discharge end 54. The chipping elements 56 may be in the form of plates having toothed edges 58 arranged in a chevron pattern. The chevron pattern may extend longitudinally of the trough 24. As shown best in FIG. 4, the plates 56 may be shaped and arranged to form two rows of parallel plates 56. In other embodiments, the plates may be shaped to form a single row in a chevron pattern having toothed edges 58.

In embodiments, the plates 56 may be made of hardened steel or other abrasion-resistant material, and the toothed edges 58 may be carbide tipped. The toothed edges 58 are shown as having a squared shape in FIGS. 8 and 9, but in other embodiments, may have pointed, rounded, serrated or other shapes, or may be a straight edge. The plates 56 may be attached to the side walls 26, 28 of the trough 24, and spaced from each other such that glass particles and chunks (not shown) chipped from a CRT 22 may fall between the plates onto the bed 30 of the trough, where vibrating action of the trough and/or gravity may cause them to progress along the bed to the discharge end 52 and chute 54.

Figure 8:
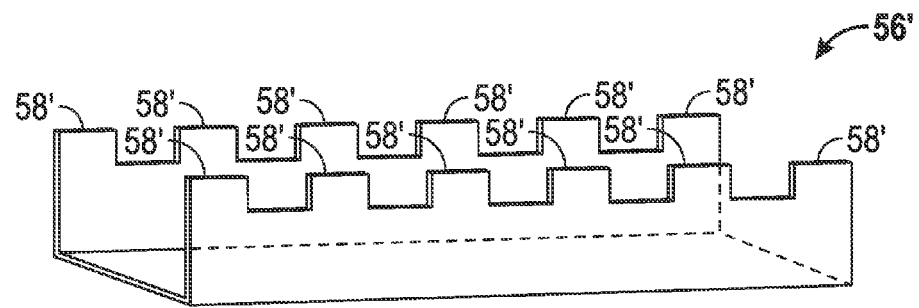
FIG. 8 is a perspective view of one embodiment of a chipping element of the disclosed apparatus.
Figure 10:
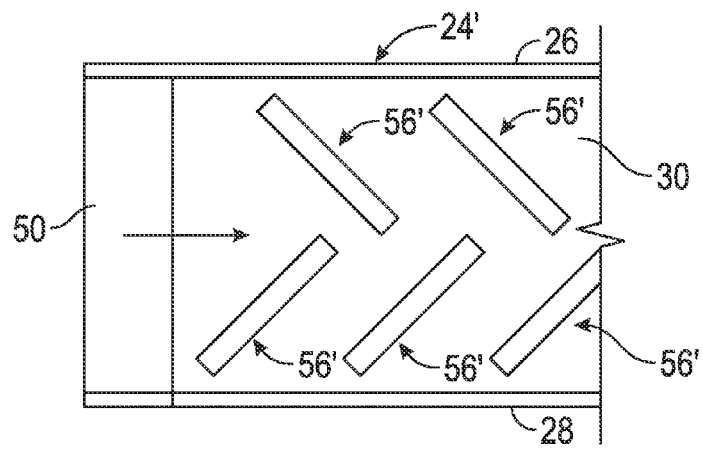
FIG. 10 is a detail top plan view of a second embodiment of the disclosed apparatus, utilizing the chipping element shown in FIG. 8.

As shown in FIGS. 8 and 10, in another embodiment 10', the trough 24' may include chipping elements 56' in the form of inverted, U-shaped channels, best shown in FIG. 8. The channels 56' may include toothed edges 58' that extend upwardly from the bed 30 of the trough 24'. The channels 56' may be attached to the bed 30 by rivets, welding, screws, adhesives, combinations of the foregoing, or other well-known means. As shown in FIG. 10, the chipping elements 56' may be arranged in a chevron pattern, or in other embodiments, arranged in different patterns or orientations. It may be preferable to orient the elements 56' such that the channels are generally parallel to the inclination of the trough 24' so that glass chips falling upon the channels or bed 30 will flow downwardly to the discharge end of the trough 24' (similar to discharge end 52 in FIGS. 3 and 4) by vibrating action of the bed and/or gravity.

The operation of the apparatus 10 to separate the panel 14 from a CRT 12 is as follows. A CRT 12 of a type generally as shown in FIG. 1 may be received for recycling. The bulk of the funnel 16 may be removed, so that the CRT may appear in the form of CRT 22 shown in FIG. 2, having with a jagged remnant of the glass funnel 16. The CRTs 22 may be placed on the feeding end 50 such that their panels 14 face up and the jagged remnants of their funnels 16 face down. The CRTs 22 may be urged or allowed to progress along the trough 24, either by vibrating action of the trough 24 and chipping elements 56, 56' by gravity, or both. In embodiments in which the trough 24 is inclined downwardly from the feeding end 50 to the discharge end 52, the CRTs 22 may move longitudinally along the trough as shown in FIG. 4.

The trough 24 may be vibrated by the eccentric drive assembly 38, causing the chipping elements 56, 56' to contact the remnants of the funnels 16 of the CRTs 22. The pieces of the funnel 16 chipped away from the CRTs 22 by contact with the chipping elements 56, 56' may drop downwardly to the bed 30 where they are conveyed by gravity along the trough 24, 24' to the discharge end 52 and may fall downwardly through chute 54 to a collection bin or other container (not shown).

In embodiments, the chipping elements 56, 56' may be actuated to impart an upward throw to the CRTs 22 traveling along the trough 24, 24', which may cause the CRTs 22 to repeatedly fall downwardly upon the vibrating edges 58, 58' of the chipping elements 56, 56'. The trough 24, 24' may be sized such that the funnel 16 may be substantially entirely removed by chipping or other action by the time the CRTs 22 reach the discharge end 52. The presence of the implosion band 18 may prevent the chipping elements 56, 56' from chipping into the glass of the panel 14. In embodiments, the eccentric drive assembly 38 may be configured to cause the chipping elements 56, 56' to vibrate at a frequency and at a throw angle selected to cause the chipping elements to throw the CRTs in contact with them upward, then move upward themselves subsequently to contact the now downwardly moving CRTs 22 to provide an impact with sufficient force to chip away the glass funnel 16 and frit 20 from the panel 14.

Figure 7:
FIG. 7 is an elevational view of a cathode ray tube in which the frit and funnel have been removed from the panel after application of the disclosed method and apparatus.

When the CRT 22 reaches the discharge end 52, it may have the appearance in FIG. 7 as CRT 22'. This CRT 22' may comprise a relatively intact panel 14, and the implosion band 18, which may be removed later. However, substantially all portions of the funnel 16 and frit 20 (FIGS. 1 and 2) have been removed by repeated contact with the chipping elements 56, 56', conveyed downwardly to the discharge area 52 and removed from the trough 24 through discharge conduit 54. Once the implosion band 18, has been removed, the panel 14 is available for recycling.

In another embodiment, the CRT 22 may be held in a substantially fixed position by a user or a jig 60 (FIGS. 3 and 4) and the remnant of the funnel 16 brought into contact with one or more chipping elements 56, 56'. For example, a user or jig may hold the CRT 22 in position shown in FIGS. 3 and 4 and bring the funnel 16 into contact with the chipping elements 56 of the trough 24. The vibrating action of the chipping elements 56, 56' may chip away the funnel 16 and frit 20 until only the panel 14 remains. Chips of the funnel 16 and frit 20 may be conveyed along the bed 30 to the discharge end 52, or fall downward by gravity through holes (not shown) formed in the bed.

In yet another embodiment, shown best in FIG. 9, the trough 24 may include a transverse bar 62 extending between side walls 26, 28. The bar 62 may include chipping elements in the form of upwardly projecting teeth 64. Teeth 64 may be positioned at an elevation above edges 58 of chipping elements 56. The teeth 64 may have a triangular shape, as shown, or other shapes, such as rectangular, trapezoidal, parallelogram, rounded, and combinations thereof. The teeth 64 may be present alone on the trough 24, or present in combination with chipping elements 56. Teeth 64 also may be attached to and project upwardly from dividing wall 66 separating rows of chipping elements 56. Teeth 64 may be formed of hardened steel, or other wear-resistant material, or steel layered with hardened material, such as carbide or other wear-resistant material.

As described above, the apparatus 10, 10' for chipping a funnel portion from a panel portion of a cathode ray tube may be operated continuously, and provides a higher through-put of removing the funnel portion from the panel a cathode ray tube than prior art methods and devices. While the forms of apparatus and methods disclosed herein constitute preferred embodiments of the invention, it is to be understood that modifications may be made therein without departing from the scope of the invention.

What is claimed is:

1. An apparatus for separating a panel from a cathode ray tube, the apparatus comprising:
    a trough;
    at least one chipping element mounted in the trough; and
    a vibrator connected to the trough and configured such that actuation of the vibrator causes the at least one chipping element to vibrate at a frequency and at a throw angle selected to cause the at least one chipping element to throw a cathode ray tube placed in contact therewith upward, then move upward subsequently to contact a downwardly moving cathode ray tube with sufficient force to chip away funnel and frit therefrom.

2. The apparatus of claim 1, wherein the trough includes a feeding end and a discharge end; and the trough is inclined such that the feeding end is elevated above the discharge end.

3. The apparatus of claim 2, wherein the vibrator is configured to vibrate the trough to impart an uphill vibratory throw to objects placed on the at least one chipping element.

4. The apparatus of claim 3, wherein the uphill vibratory throw is between 5° and 15°.

5. The apparatus of claim 1, wherein the at least one chipping element includes at least one of a bar, a plate, and a transverse bar with upwardly projecting teeth.

6. The apparatus of claim 5, wherein the bars include inverted channels.

7. The apparatus of claim 6, wherein the channels are made of hardened bar stock.

8. The apparatus of claim 1, wherein the at least one chipping element includes a plurality of projections facing upwardly from the trough.

9. The apparatus of claim 8, wherein the projections include at least one of a square shape, a pointed shape, a rounded shape, a serrated shape, a parallelogram shape, and a rectangular shape.

10. The apparatus of claim 1, further comprising a plurality of chipping elements, at least some of the plurality of chipping elements being elongate and positioned on the trough at a non-perpendicular angle relative to a product flow dimension thereof.

11. The apparatus of claim 10, wherein the chipping elements are arranged on the trough in a chevron pattern.

12. The apparatus of claim 1, wherein the trough is inclined about 30° to the horizontal.

13. The apparatus of claim 1, wherein the trough is oriented horizontally.

14. The apparatus of claim 1, wherein the vibrator provides vibrating action to the trough of at least one of between 900 and 1100 hertz, and 600 hertz.

15. An apparatus for separating a panel from a cathode ray tube, the apparatus comprising:
- a trough having a feeding end and a discharge end, the trough being inclined downward from the feeding end to the discharge end;
- a plurality of chipping elements mounted in the trough; and
- a vibrator connected to the trough and configured such that actuation of the vibrator causes the chipping elements to vibrate at a frequency and at a throw angle selected to cause the at chipping elements to throw a cathode ray tube placed in contact therewith upward at an angle inclined toward the feeding end, then move upward subsequently to contact a downwardly moving cathode ray tube with sufficient force to chip away funnel and frit therefrom.

16. A method for separating a panel from a cathode ray tube, the method comprising:
- contacting a funnel of the cathode ray tube with at least one chipping element; and
- vibrating the at least one chipping element with sufficient force to chip at least the funnel from the cathode ray tube, leaving at least the panel.

17. The method of claim 16, wherein vibrating the chipping element further includes vibrating the at least one chipping element with sufficient force to chip at least the funnel from the cathode ray tube until the at least one chipping element contacts an implosion band of the cathode ray tube.

18. The method of claim 16, wherein vibrating the chipping element includes vibrating the at least one chipping element with sufficient force to chip at least the funnel and frit from the cathode ray tube.

19. The method of claim 16, wherein contacting the funnel of the cathode ray tube with the at least one chipping element includes causing the cathode ray tube to move along a trough containing the at least one chipping element such that the cathode ray tube passes over the at least one chipping element.

20. The method of claim 19, wherein causing the cathode ray tube to move along the trough includes causing the cathode ray tube to move along the trough inclined from a feeding end downwardly to a discharge end.

21. The method of claim 20, wherein causing the cathode ray tube to move along the trough inclined from a feeding end downwardly to a discharge end includes positioning the trough at about 30° to the horizontal.

22. The method of claim 20, wherein vibrating the at least one chipping element includes vibrating the at least one chipping element so that a vibratory throw of the chipping element is uphill.

23. The method of claim 22 wherein vibrating the at least one chipping element so that the vibratory throw is uphill includes vibrating the at least one chipping element at an uphill angle of between 5° and 15° to the trough.

24. The method of claim 16 wherein contacting the funnel glass of the cathode ray tube with the at least one chipping element includes contacting the funnel glass of the cathode ray tube with a plurality of chipping elements.

25. The method of claim 24 wherein contacting the funnel glass of the cathode ray tube with the plurality of chipping elements includes contacting the funnel glass with a plurality of chipping elements having projections oriented upwardly.

26. The method of claim 16 further comprising causing chipped particles of the funnel of the cathode ray tube to travel along a vibrating trough.

27. The method of claim 16 wherein vibrating the chipping element includes vibrating the chipping element at between 900 and 1100 hertz.

28. A method for separating a panel from funnel and frit of a cathode ray tube, the method comprising:
- contacting the funnel of the cathode ray tube with at least one chipping element; and
- vibrating the at least one chipping element with sufficient force to chip at least the funnel from the cathode ray tube, leaving at least the panel.

* * * * *